Dec. 6, 1955  H. A. CAMPISI  2,726,380
SLEEP WARNING DEVICE

Filed Jan. 25, 1954  3 Sheets-Sheet 1

INVENTOR.
HUGO A. CAMPISI
BY
ATTORNEYS

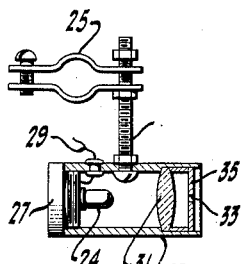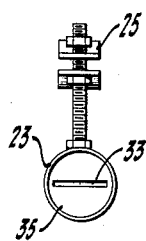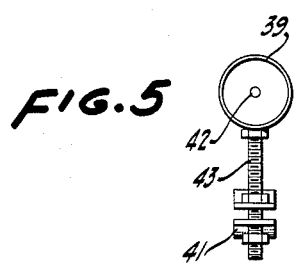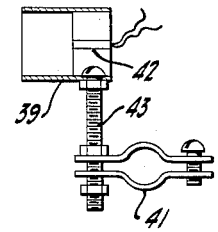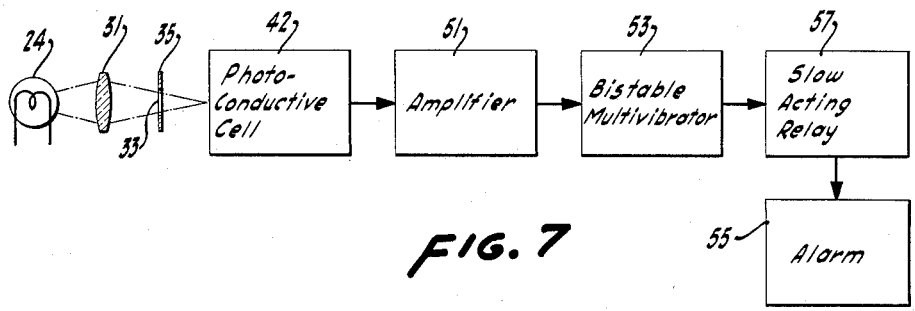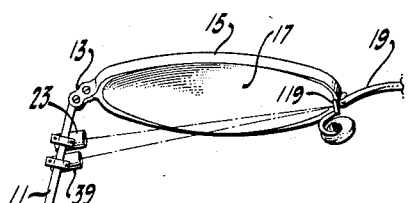

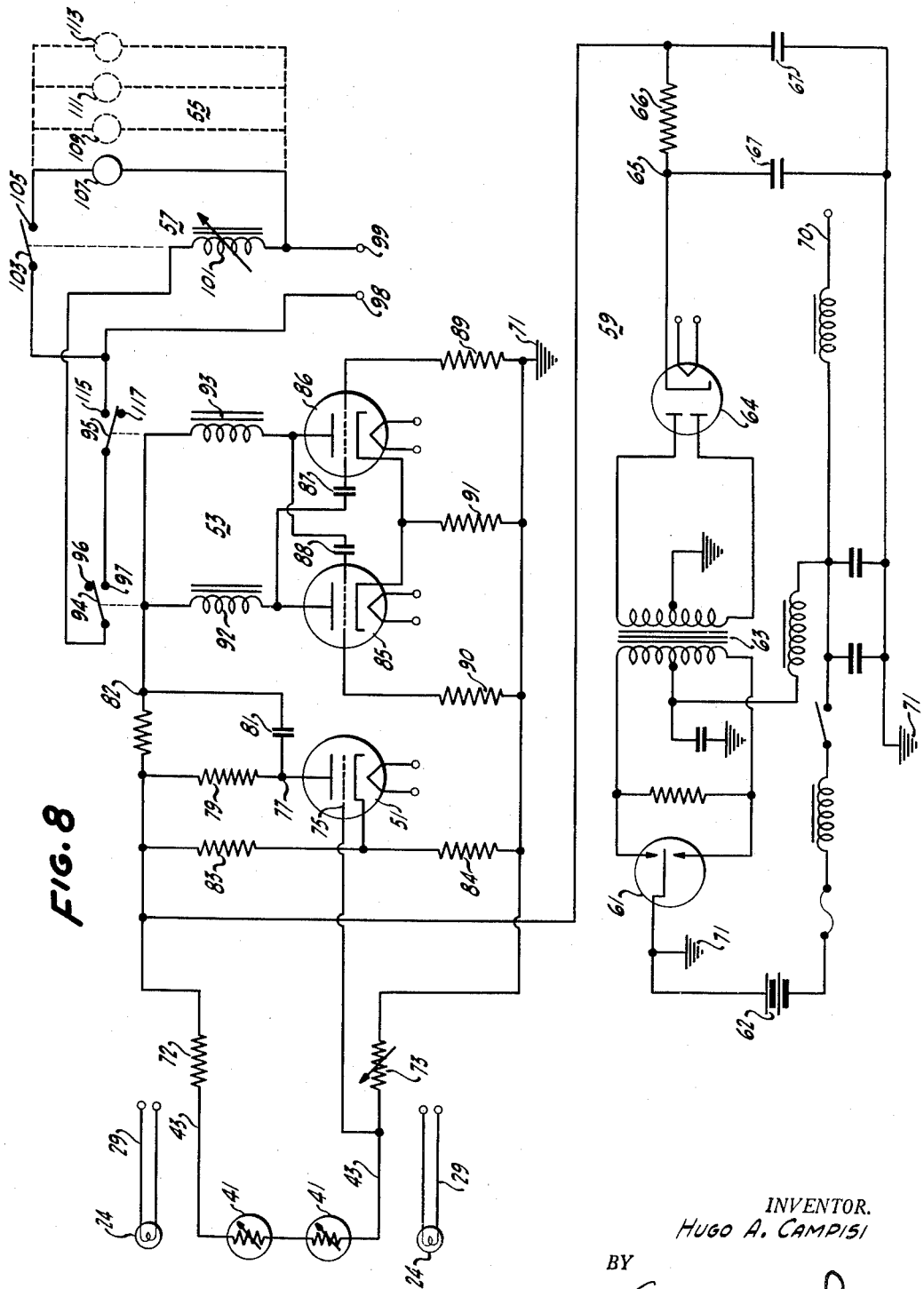

2,726,380

SLEEP WARNING DEVICE

Hugo Amilio Campisi, Belmont, Calif.

Application January 25, 1954, Serial No. 405,785

8 Claims. (Cl. 340—279)

This invention relates to a sensing component and device, as well as a mechanism or circuit therewith associated which has in its primary objective that of providing ways and means the user may be safer in driving because of freedom from worry over a lack of warning of fatigue and need of sleep which might otherwise not be so readily apparent. It is a well known fact that a great many of the motor car accidents which occur daily result from human deficiencies coming about mainly because of overtired conditions of one or both of hte drivers involved. Often times an overtired driver tends, almost unknowingly and particularly at times when the roads are quite free from obstructions and heavy traffic, momentarily to close his eyes because of the need of sleep. The result is that even extremely short time intervals are sufficient to be the proximate cause of many accidents which could be avoided with adequate warning.

The present invention is one which aims at warning the driver or operator of the dangerous conditions and approach of fatigue almost instantly with occurrence so that the driver is either caused to be sharply aroused and fully awakened or is warned that it is going to be necessary, temporarily at least, to rest and to remove himself and the vehicle being driven from the highway.

In its essence the invention herein to be described comprises the combination of warning circuitry which operates in response to a control signal which may be developed in various ways included among which is a control operating as a result of the eclipsing of a light beam, for instance, at times when the driver's eyes tend to close to a condition of sleep, but which control will not respond to the normal winking or nictation of the eyes. In order to effect this type of control the invention contemplates the use, in one of its preferred forms, of a pair of spectacles which are to be worn by the party to be warned. Such spectacles may, if desired, be provided with the normal type of lenses which the driver or operator would use for normal eye correction purposes or where the operator is not accustomed to wearing glasses the spectacles may be of the form of spectacle frames provided either with pure glass, darkened glass to prevent glare or which may be completely free from glass.

In the preferred form of spectacle mechanism a suitable light source is connected to one or both of the bows and arranged in combination with an appropriate form of optical system to direct its light as a collimated beam toward the nosepiece of the glasses. A suitable light responsive light cell, such as the ordinary photoconductive cell which is connected to activate a suitable control circuit, is arranged at the end of the optical path. Such a light responsive cell may be held in the region of the bridge or nosepiece of the spectacles or, for instance, the light may be reflected from the region of the nosepiece to fall upon a suitable light responsive cell held elsewhere and, for instance, on the bow adjacent to the light source. The so-established collimated light beam developed by the light source is directed between the bow of the spectacles and the nosepiece so as to traverse a path close enough to the operator's eyes that the eyelashes, during winking or nictation, cause this light path to be eclipsed or intercepted and interrupt the light rays which otherwise would be directed into the light responsive cell. For the purpose of the control herein to be described it will be appreciated that the light rays may be chosen within the range of the visible portion of the spectrum but if for any reason it be desired that the ray be unseen invisible portions of the spectrum can be used and the radiation from the source to effect the photoconductive cell may be in the infra-red or ultra-violet range of the spectrum by placing appropriate filters in the light path. The light falling upon the photoconductive cell is caused to develop output current therefrom in well known fashion so that any interruptions or eclipsing of the light rays directed to the light conductive cell will almost instantaneously interrupt the output from the photoconductive cell element. The photoconductive cell is adapted to be connected in circuit with a suitable bistable control element, such as a bistable multivibrator, which supplies its output to a slow acting or adjustable delay control device, such as a relay which, in turn, controls the initiation or carrying into operation of suitable forms of alarm mechanisms.

The response period of the slow acting control device, such as a relay or its equivalent, is set at such time period that it will not function within the time period normally allocated to the closing and opening of the eyelids of the operator with winking. However, with closure of the eyelids and a failure to reopen them promptly the operating control will respond to the change in its operating state coming about as a result of the single interruption of the light rays upon the photoconductive cell in such a way that suitable alarm devices will be caused to function following a period of time corresponding to that allocated to the delay action of the control device.

It therefore becomes an object of the present invention to provide a device which will serve to warn the operator of a motor vehicle or any other individual in any other capacity of the approach of fatigue or a sleepy state where warning is desirable. The same components may, in many instances, be of particular importance for use by watchmen on duty at various plants in order that they may be continually apprised of any condition of approaching sleep. Likewise, operators of various types of machines may be advised of such conditions particularly at times where the monotony of work might tend to induce conditions of sleep. In addition, the same types of components may have a military use where men on long marches may be warned of occasional sleepy conditions.

A further object of the invention is that of providing a form of control mechanism preferably in the form of spectacles which may be worn by the party desiring to be warned and which may be designed to provide substantially the same comfort as would the ordinary spectacles without the added attachments of the control and controlling mechanisms herein to be described which can either be separately supported or even carried on the user's person in separate containers or housings.

Other and further objects of the invention will, of course, suggest themselves to those skilled in the art to which it is directed when the following description is considered in connection with the accompanying drawings wherein:

Fig. 3 is a schematic illustration of one form of light developing component and light collimating means particularly adapted for attachment to the bows of the spectacle frames schematically illustrated by Figs. 1 and 2;

Fig. 4 is an end view of Fig. 3 looking in the direction from right to left as Fig. 3 appears on the sheet;

Fig. 5 is a schematic showing of one form of photoconductive cell support and housing, as arranged for attachment to the spectacle frame and for positioning adjacent to the bridge or nosepiece;

Fig. 6 is an end view of the device shown by Fig. 5 shown looking from right to left as the figure appears on the sheet;

Fig. 7 is a schematic showing in block form of the circuitry arranged to function under the control of the components adapted to be attached to the spectacle frames and shown by Figs. 1 through 6;

Fig. 8 is a schematic circuit of the type adapted for use in connection with the block diagram showing of Fig. 7; and Fig. 9 is a modification of Fig. 1 showing a different arrangement of the light source and light sensitive photoconductive cell or phototube.

Figure 1:
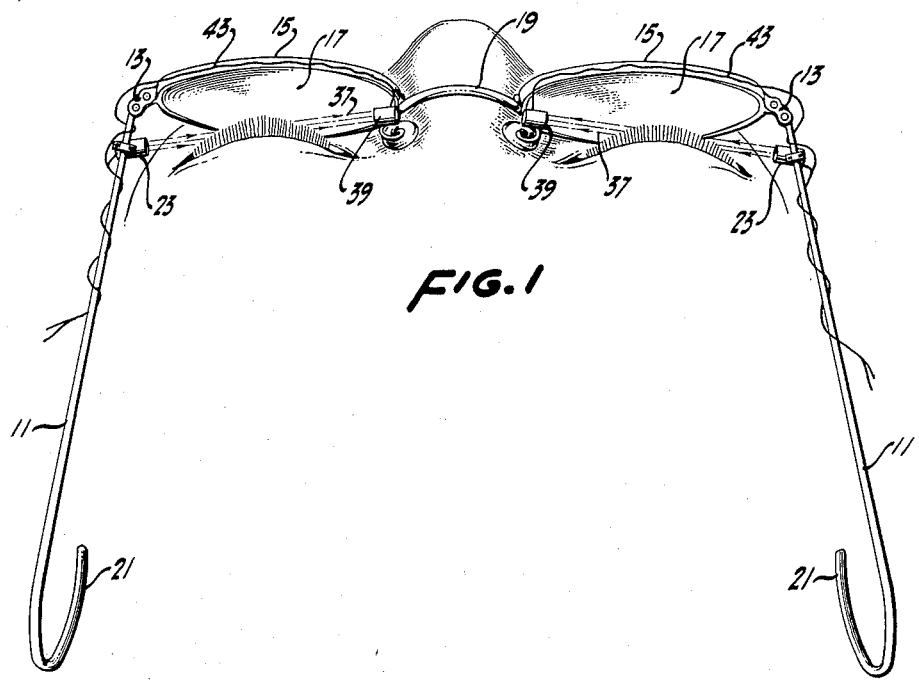
Fig. 1 is a plan view of open form schematically to illustrate the arrangement of the spectacle frames and the thereto attached light developing and light translating components.
Figure 2:
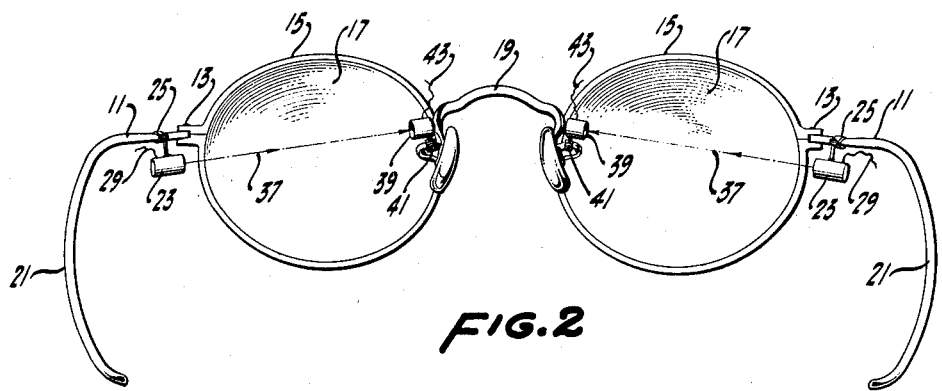
Fig. 2 is an elevation view intended to show the collimated light beam passing between source and the light translating mechanism as adapted to be intercepted by the wearer's eyelashes.

Considering now the showing of the drawings and first particularly of Figs. 1 and 2, the spectacle frames comprise the side pieces or bows 11 which are hingedly attached at points such as 13 to the main frame 15 which is adapted to hold the eyeglass elements 17. The right and left eye portions of the frame are attached to each other by the bridge or nosepiece section 19.

Suitable means for holding the spectacle frames upon the operator may be provided in the form of the conventional ear supports, such as are represented at 21.

A container or housing 23 for holding the light source 24 is suitably secured by any appropriate means, such as the bracket 25, upon the bows 11 at a point closely adjacent to the hinge 13. Within the housing 23 the light source, conveniently represented in the form of the so-called Mazda lamp 24, is carried upon a base 27 which serves to close one end of the housing. Operating voltage for lighting the lamp 24 is provided in the conventionally indicated manner by way of the conductors 29 which may if desired be arranged to pass internally of the bows 11 or may be appropriately secured thereto and pass toward the ears of the observer to be connected to a suitable source such as a battery or a conventional vibrator type of power supply. The connection to such a power supply may be made in much the same fashion as the cord of a hearing aid connects to its separate battery and amplifier unit.

Light which emanates from the source 24, which is confined within the tubular housing 23, is then directed through an appropriate lens 31 and the collimating slip 33 of the baffle 35 so as to be directed along a path conveniently designated as 37 to fall within a light collecting element 39 suitably secured in one form of the device by an appropriate means, such as the bracket 41, to the spectacle frame at a point closely adjacent to the bridge or nosepiece 19. A suitable light translating element, such as the conventionally represented photoconductive cell 41, is contained within the housing 39 which forms a hood thereabouts. The photoconductive cell, as represented by Fig. 8 in particular, is connected to an appropriate voltage source so that the gathered light causes current to flow through the photoconductive cell with illumination thereof. As may be seen by particular reference to Figs. 7 and 8, suitable conductors, such as those represented at 43, supply the connection to an appropriate external circuit which may also contain the hereinabove mentioned power supply.

It is, of course, to be noted that the adjustable nature of the bracket and clamp means to support ends of the light source and its housing, as well as the photoconductive cell and its housing, permits ready adjustment and alinement of the light path for each user in order that eyelid closing shall bring the eyelashes into the optical path. An adjustment of this nature is little more than might be expected to fit any pair of spectacles to the wearer, but it is important that adjustment be permitted in order to provide maximum utility of the unit.

The photoconductive cell 41 in the usual operation is of extremely small size. One form of such cell, without limitation as to its dimensions, has been described in an article by R. J. Cashman entitled "Lead Sulphide Photoconductive Cells for Sound Reproduction," which appeared in the "Journal of the Society of Motion Picture Engineers," volume 49, starting at page 342 of the October 1947 issue. Generally speaking a cell of this type consists of a thin coating of lead sulphide deposited between two electrodes on the inner surface of a glass envelope. When light impinges upon the lead sulphide layer the resistance is changed so that whenever the cell is connected in series with a D. C. polarizing voltage and a resistor variations in light reaching the cell are translated into voltage variations in a manner generally similar to the more conventional phototubes. However, other similar types of light translating elements may be used and these may even be the well known selenium type of element or a small size form of the more common photoelectric tube.

If the location of the light source and the collimating slit used to direct the light upon the photoconductive-type cell is such that the light path is directly before the eye of the wearer of the spectacles and in a region where the light path can be eclipsed by the eyelashes as the eyelids open and close the output current from the photoconductive cell will be changed at each eclipse of the light beam. Under such circumstances, the effective voltage which can reach any control circuit (see particularly Figs. 7 and 8) will be changed with an eclipse of the light falling along the path, such as that shown at 37. It is in this way that the wearer of the spectacles controls by movement of the eyelids the current flowing out of the photoconductive-type cell.

By arranging appropriate circuitry to respond to the output current flowing from the photoconductive cell it is possible to provide alarm indications signifying the movement of the eyelids. However, since any individual customarily rapidly winks the eyes from time to time, regardless of the state of fatigue or sleepiness, provision must be made in any controlled circuitry whereby the controlled elements cannot respond to extremely rapid light path interruptions which occur at times the eyelashes rapidly move downwardly and then are immediately followed by a rapid upper movement since this condition occurs so often. However, any response circuitry should respond to conditions where the eclipsing of the light beam path occurs by closure of the eyelids causing the eyelashes to interrupt the light beam which is not followed by a prompt reopening of the eyelids to provide a second eclipsing of the light beam at a closely spaced interval of time because the absence of a second eclipse would indicate that the eyelids had remained closed and thus that the party was either asleep or approaching that state.

Making reference now to the showing of Fig. 7, which is a conventional representation of circuitry for control but lacking a schematic showing of suitable power supply source, a suitable sequence of components by which the mechanism of the present invention operates has been depicted. By this arrangement the light source 24 is shown as directing its light through the lens 31 and the collimating slit 33 (shown with its long dimension) of the masking element 35 to illuminate the photoconductive cell 41. The cell 41 may be directly illuminated (as in Fig. 1 or 2) or be indirectly illuminated by reflected light (as by the device of Fig. 9). Any output currents resulting from that light which does reach that photoconductive cell 41 are arranged to flow through an appropriate amplifier 51 whose output is connected to supply a bistable control element, such as that represented by the bistable multivibrator 53.

The showing of Fig. 8 exemplifies one form of circuit which such a component may assume. Illustratively, a bistable control circuit of the type preferred is one which has two stable limiting conditions of operation in contrast to two unstable limiting conditions as in the usual multivibrator. A suitable form of bistable control circuit is represented by the well known Eccles-Jordan trigger circuit, the operation of which is described in the text "Time Basis" by O. S. Puckle, published by John Wiley & Sons, Inc., 1943 and described at page 54 and the pages immediately following. A similar type of control circuit is one which is known as Schmitt's trigger circuit which is described in the portion starting at page 57 of the Puckle text hereinbefore mentioned, and which circuit has also been described by O. H. Schmitt in the "Journal of Scientific Instruments" for 1938, in Volume XV, starting at page 24 in an article entitled "A Thermionic Trigger." The output of such a bistable control element in one of its two operational states is supplied to initiate an operation of an alarm or indicating mechanism by way of an appropriate delay mechanism of which one form may be constituted by a suitable slow operating relay. A device of this type is usually in the form of a relay having a lag coil or slug and one which can be used on D. C. coils. The lag is usually controlled by a large copper slug at one end of the winding or by a tubular sleeve between the winding and the core.

In this type of operation the lag coil acts as a short-circuited secondary for the relay coil and when so operating the counter magnetomotive force due to the current introduced in it by the changing coil current delays the flux buildup in the air gap with the result that the time when the armature closes is delayed.

Units of this type are well known in practice and are explained for instance in the well known text entitled "Components Handbook" which constitutes volume 17 of the Radiation Laboratory Series, published in 1949 by McGraw-Hill Book Company, Inc. and reference may be made, for instance, to the portion of that said text commencing at page 480. A relay of this type is also pictorially represented in numerous other texts, including the "Engineers Illustrated Thesaurus" published in 1952 by the Chemical Publishing Company, Inc. of New York in which reference may be made specifically to pages 512 and 513.

Consequently, with any interruption or eclipse of light directed from the source 24 to the photoconductive cell 41 the effect is translated through the entire system by way of the bistable control 53 to determine the operation of the slow acting mechanism 57. Where the light interruptions or eclipses of the light beam path 37 occur in rapid sequence the bistable control is so controlled that it can return to its initial operational state prior to the time when the slow acting mechanism can function, but where two rapidly recurring light interruptions do not occur the bistable control, which is shifted from one operational state to another by the first applied control pulse, maintains that state and the slow acting mechanism is permitted to function to initiate an operation of the alarm mechanism diagrammatically shown at 53. This alarm mechanism may be of various forms and types provided it serves the purposes of warning the wearer of the spectacles of conditions obtaining. Illustratively, the alarm mechanism may be such as to ring a bell, blow a horn, start a siren in operation, administer a mild electric shock or perform some other function to warn the operator of the condition of sleep or fatigue.

For a more specific embodiment of circuitry by which the alarm indications may be developed as a result of light interruptions to the photoconductive cell 41, reference may now be had to the showing of Fig. 8. In this figure it will be observed that the lamps 24, which may be illuminated from any desired source (not shown) but connected, for instance, by conductors 29, direct light upon the photoconductive cells 41.

The two photoconductive cells 41 are illustrated in series connection and are supplied with operative voltage from a source generally represented at 59.

The light which is directed from the sources 24 to the photoconductive cells 41 causes current to flow therethrough when the cells are connected through appropriate conductors, such as 43, to a source of operating voltage which may be arranged on a part of a unit completely separate from the spectacle frame. Preferably the conductors 43 connect the cells 41 to such a separate unit, which would also comprise in its essence the components designated in Fig. 7 as the amplifier 51, the bistable control 53 and the slow acting relay or delay means 57 which is adapted to control the alarm mechanism 55. The suitable power supply source, conventionally represented in Fig. 8 by the designation 59, is arranged to power the complete circuit.

For convenience of reference only brief mention of this type of power supply unit is required inasmuch as it is essentially the general type customarily used with battery operated portable radio sets. As such, it comprises the usual vibrator tube 61, which is connected to be supplied from a suitable battery or the like 62. The vibrator tube 61 has the usual contacts and the pulsating current flow through the primary winding of the transformer 63 when made available in the transformer secondary is applied to the usual type of rectifier tube 64 at the cathode output of which the high voltage or +B potential becomes available. The rectifier voltage thus available at the point 65 is filtered in the usual manner by a filter comprising the usual series resistor (or inductor) 66 and suitable shunt capacity elements 67 with the result that substantially steady potential to supply plate voltage upon the various tubes becomes available on the conductor 69.

In the usual manner the voltage to supply all heaters becomes available at the terminal 70, so that high voltage for plate or anode operation of various tubes is available between the conductor 69 and ground 71 and the heater voltage for the same tubes becomes available similarly between the points 70 and ground 71. This portion of the circuit is generally standard and is too well known to require further explanation.

The suitable high voltage available upon the conductor 69 in the connection shown becomes available in a series connection through the resistor 72, the photoconductive cells 41, the resistor 73, which is usually made variable, which connects to ground 71. For conditions when light reaches the photoconductive cells 41 a current flow occurs therethrough but it will be appreciated that at times of light interruption upon the photoconductive cells 41 the potential effective to control a current flow through the amplifier tube 51 of which the grid connects to one terminal of resistor 73 changes with a result that the potential effective to control the output of tube 51 rises or falls depending upon whether or not a current flow occurs through the photoconductive cells 41. With a change in current flow through the cells 41, resulting from the presence or absence of light falling thereon, it will be appreciated that the output of the amplifier tube 51 changes in such a way that with current flow being interrupted in the tube 51 the potential available at the point 77 where the tube anode is connected to plate resistor 79 a rise in potential occurs with a result that a positive pulse is transferred through the condenser 81 to become available at the point 82 for the purpose of controlling the operation of a suitable bistable control circuit conventionally represented in this figure at 53. The resistors 83 and 84 connected across the supply serve as a voltage divider and the tube cathode which is connected at the junction is thus biased to control the tube operation. The control circuit 53 is conventionally shown as a bistable multivibrator.

The voltage which is effective at the grid 75 of the amplifier 51 to determine the current flow through the tube is established by the fact that under conditions of darkness the resistance of photoconductive cells 41 becomes extremely high and may approach a value up to 10 megohms, but with conditions of illumination the resistance is changed and drops to a relatively low value. Considering a condition where light has been cut off to the photoconductive cells 41, as by the eyelashes eclipsing the collimated light beam from the source 24, current flow through the amplifier 51 is interrupted and the potential of the point 77 instantly rises to a value which is essentially the potential on the conductor 69. This voltage effective as a pulse is transferred through the coupling condenser 81 and appears at the point 82.

If it be assumed, as must be the case, that in the bistable control circuit, such as the illustrated multivibrator unit 53, that one of the tubes 85 and 86 conducts while the other tube is non-conducting it may be assumed that for the normal condition of operation that the tube 85 will be non-conducting while the tube 86 will be conducting. The tubes 85 and 86 are connected so that the plate or anode of one tube connects to the grid or control electrode through a coupling condenser, such as that shown as the coupling condenser 87, to connect the plate electrode of the tube 85 to the grid of the tube 86. The condenser 88 is arranged to connect the plate of the tube 86 to the grid of the tube 85. Each of these condensers is provided with an appropriate grid leak resistor to ground such as the grid leak 89 for the condenser 87 and the grid leak resistor 90 for the grid condenser 88. The cathodes of the tubes 85 and 86 are connected together and to ground through the usual cathode resistor 91. The tubes 85 and 86 in the form shown may have their plate load in the form of the relay windings 92 and 93 respectively. The armatures for the relays 92 and 93 are shown respectively at 94 and 95, arranged to contact terminal points later to be described.

If now the instantaneous condition obtaining is one where the tube 85 is assumed to be non-conducting and the tube 51 is assumed to be carried from a conducting to a non-conducting state, the rise in potential which becomes available instantantly at the point 82 is transferred simultaneously through the relay windings 92 and 93 to become effective at the grid element of each of the tubes 85 and 86. However, since the tube 85 has been in a non-conducting state the pulse is effective there instantly to cause the tube to draw current whereas a similar change in operating state does not result at the tube 86 because the tube is already drawing current. Consequently, the increase in potential at the grid of the tube 85 due to the change in static condition causes this tube instantly to draw plate current with the result that the potential effective at the plate is then transferred through the condenser 87 to bias the grid or control electrode of tube 86 toward a cut-off state. This operation, of course, causes the potential at the anode or plate of the tube 86 to rise with the result that the rise in potential is transferred to the grid of the tube 85 by the condenser 88 to carry it still more positive and as current flow increases through the tube 85 the tube 86 is promptly cut-off. With current flow through the tube 85 there is built up through the relay winding 82 a flux which is of sufficient magnitude to cause the relay armature 94 to move from its upper contact point 96 (against which it may be assumed to be spring biased as shown) down to its lower contact point 97.

Under such conditions it will be appreciated that the relay armature 95, which is actuated by the armature coil 93 connected as the load on tube 86 and which may be assumed to be in the position shown by Fig. 8 prior to the time tube 85 is carried to a conducting state (that is with tube 86 drawing current), will be released as soon as tube 86 is carried to a non-conducting state and will be biased upwardly from the shown position by a suitable spring. A shift in the position of the armature 94 from contact 96 to contact 97 when tube 85 draws current, and a release of the armature 95 to its upper contact with tube 86 carried to a non-conducting state, will permit the closure of a circuit between the terminal points 98 and 99 across which a suitable voltage source (not shown) is connected so that current can flow through the adjustable delay or slow acting relay conventionally represented at 57.

The operation of an adjustable delay or slow acting type of relay has been explained above in connection with the description of Fig. 7 and requires no further mention other than to state that after the delay period for which the relay is adjusted current flow through the relay winding 101 will cause the spring loaded armature 103 (normally held in an open state by suitable spring loading, not shown) to close upon the contact 105. Closure of armature 103 upon terminal 105 permits current flow from the source connected at terminal points 98 and 99 through the relay armature 103 and the contact 105 to one or more suitable alarm devices 55 of which conventionally represented components such as 107, 109, 111 and 113 may be assumed to be utilized. Where these components are provided they may be utilized individually or as a group and as above noted they may be in the form of bells, horns, sirens, shock elements or the like.

With the condition obtaining such that the tube 85 is assumed to draw current to move the relay armature 94 to its lowered position against the force of a suitable spring or the equivalent (not shown) to rest upon the contact 97 the interruption of current in the tube 86 permits the armature 95 of the relay 93 to hold in its upper position against the contact point 115. However, if an interruption of the light falling upon the photoconductive cells 41 occurs following the first interruption just described within a time period less than that for which the slow acting or adjustable time delay relay 57 is set to operate it will be appreciated that the current flow through the tube 51 is again interrupted with a result that he potential at the point 82 again rises rapidly and becomes available o control the grid potential of each of the tubes 85 and 86. Since he tube 86 at such times then will be non-conducting (because the tube 85 is conducting) this increase in potential when applied to the tube grid through the relay winding 92 and condenser 87 is sufficient to cause the tube 86 to conduct and the reverse of the operation described for carrying tube 85 to an operative state occurs.

Folowing the analysis previously given for a change in the conductive state of the tube 85 from non-conducting to conducting, it will be evident that the tube 85 is caused to return to a non-conducting state and current flow through the tube 85 is interrupted but concurrently the tube 86 is rendered conducting. The relay winding 93 which loads the tube 86 then has current flowing through it to cause the relay armature 95 to move to its lower contact point 117 which at once opens the circuit between the terminal points 98 and 99 and interrupts current flowing through the slow acting or adjustable delay relay 57. This condition will be maintained until the next interruption of light to the photoconductive cells 41.

Under the circumstances, it becomes apparent that if two light interruptions follow each other rapidly and the bistable control element, such as the multivibrator 53 is in the operating state above assumed, the adjustable delay relay or slow acting relay 57 will not have time to operate to close the armature 103 on the contact point 105 in the time interval between which the armature 94 is moved to contact 97 to close the circuit from the source connected at terminals 98, 99 through the relay 57 by way of armature 95 and contact 115 prior to the time when energization of tube 86 causes movement of the armature 95 away from the terminal point 115 to open the previously established circuit. The result is that a circuit between the terminal points 98 and 99 can never be closed to operate any of the alarm devices 55 unless relay 57 operates.

If only a single interruption of light to the photoconductive cells 41 occurs within the period during which the adjustable delay relay 57 can operate it is apparent that one or all of the alarm elements will be actuated because a condition will obtain whereby the tube 85 may be considered to be carried to a conducting with tube 86 established as non-conducting to cause the relay armature 94 to close upon the contact point 97 and since this point connects to the relay armature 95, which is held against the contact point 115 with an interruption in the current flow of tube 86, a circuit will close through the adjustable delay relay 57 and, consequently, any or all of the alarm components can function, depending upon their connections.

As contrasted with the conventional type of time delay relay or adjustable delay relay hereinabove shown and described various other modifications may be relied upon. These modifications include numerous mechanical devices connected to the relay armature, such as an escapement, a pendulum or an inertia device which may operate with or without a ratchet or the delay may be introduced by virtue of an oil or air dashpot. There are also thermal types of delay controls and in some instances electric components such as the usual forms of integrating circuits may be adopted. Components of the foregoing type are all well known and since they are considered generally equivalent to that arrangement herein shown they will not be described in further detail. Likewise, numerous forms of bistable controls may be adopted although it is believed that the general form of trigger circuit herein suggested is one of the more simple varieties.

Considering now the modification of Fig. 9 it will be appreciated that some simplification of the component arrangement and particularly the spectacles may be obtained where it is unnecessary to locate the photoconductive cells and the light sources at long distances apart. The modification of Fig. 9 is one wherein it is contemplated that the photoconductive cells and the light sources may be arranged adjacent to each other and each adjustably supported on a bow of the spectacle frames and subject to be fastened at an optimum operating position for each wearer.

Under these circumstances, substantially at the bridge or nosepiece of the spectacle frame a suitable reflecting element or mirror 119 is supported and located that when the light source is so located that the collimated beam directed outwardly therefrom to be eclipsed by the eyelashes when the eyelids are closed is along a path such that the reflector will redirect the light into the photoconductive cell in such a way that light directed from the light source to the reflector is reflected back to the photoconductive cell along a light path substantially parallel to the light path from the source to the reflector. Any eclipsing of the light falling along either of these light paths by the motion of the eyelids of the wearer of the spectacle frame will be sufficient to cause the interruption of light and the control operation hereinabove described. This modification has the advantage of eliminating substantially all of the components requiring more than an absolutely minimum of space in the region of the bridge or nosepiece of the spectacles so that even small size components are placed in a more convenient location. However, the principle of operation is still retained and the eclipsing of the light path provides for controlling an alarm mechanism in a manner analogous to that herein explained.

Having now described the invention, what is claimed is:

1. A warning device for indicating a tendency of an individual to sleep comprising an alarm, an operating circuit including a delay means to initiate an operation of the alarm in one of its operating states and a bistable control responsive to signal pulses to supply current to the delay means in one of its two stable operational states, a light source, a light sensitive element connected to control the operation of the alarm circuit in accordance with the presence and absence of light thereon to develop a flow of output current therefrom, means to collimate the light from the source and to direct the collimated light beam upon the light responsive element normally to maintain a current flow therethrough, the collimated light beam being directed from the collimating means to the light responsive device so as to pass adjacent to the eyelids of the person to be warned of his sleepy state so that each opening and closing of the eyelids causes the eyelashes momentarily to eclipse the collimated light beam directed upon the light responsive element and momentarily develop a signal pulse to trip the bistable control from one of its operational states to the other, the response period of the delay means being greater than the time interval normally required for winking the eyes to cause substantially immediate re-eclipsing of the light beam by the eyelashes to develop a signal pulse from the light sensitive element to return the bistable control to its initial operational state prior to the time when the delay means can respond to the bistable control to initiate an alarm.

2. A device to indicate an over-tired state of an individual tending to cause closure of the eyelids, comprising an alarm circuit including a slow-acting relay and a bistable control therefor, a light source, a light responsive element connected to respond to the light from the source to control the operation of the alarm circuit under the control of pulse energy developed with the presence and absence of light thereon to produce a signal output therefrom, means to collimate the light from the source and to direct the collimated light to light responsive element normally to maintain one of two operational states in the alarm circuit, the collimated light being directed from the collimating means to the light responsive device so as to pass adjacent to the eyelids of a person so that with opening and closing of the eyelids the eyelashes momentarily eclipse the collimated light beam directed upon the light responsive element so as to trip the bistable control from one of its operational states to the other, the period of action of the slow-acting relay being such that substantially immediately re-eclipsing of the light beam by the eyelashes trips the bistable control to its initial operational state prior to the time when the slow-acting relay can respond to the initiation of the second operational condition of the bistable control and maintenance of a condition following a single eclipsing of light causes an alarm to result.

3. A device to indicate an over-tired state of an individual causing a tendency to sleep and a closure of the eyelids, comprising a warning alarm circuit including a slow-acting relay, a bistable control element therein for triggering, and an alarm element operative subsequent to relay operation, a light source, a light responsive element connected to respond to the light from the source to control the operation of the alarm circuit by signal pulses developed in accordance with sudden changes in signal output thereof, means to collimate the light from the source and to direct the collimated light to light responsive element normally to maintain one of two operational states in the alarm circuit, the collimated light being directed from the collimating means to the light responsive device so as to pass adjacent to the eyelids of a person so that with opening and closing of the eyelids the eyelashes momentarily eclipse the collimated light beam directed upon the light responsive element so as to trip the bistable control from one of its operational states to the other, the period of action of the slow-acting relay being such that substantially immediately re-eclipsing of the light beam by the eyelashes trips the bistable control to its initial operational state prior to the time when the slow-acting relay can respond to the initiation of the second operational condition of the bistable control to prevent complete operation of the alarm circuit and maintenance of an operational condition of the bistable control element resulting from a single eclipse of the collimated light beam initiates an operation of the alarm element.

4. A component for use in combination with apparatus adapted to produce a warning indication of the tendency of an individual toward fatigue and sleep comprising a spectacle frame having a bridging section to join two eyeglass supports and having supporting bows hinged to the outer edges, means to establish an optical path which will cross the field of vision of the user between the user's eyes and the frame so that during nictation the user's eyelashes will eclipse the light path, a light source and a light collimating means supported upon a spectacle bow at one end of the optical path and a light sensitive means supported at the other end of the optical path to translate light directed thereto into electrical current variations and means to connect the light sensitive element to an alarm circuit.

5. The component claimed in claim 4 comprising, in addition, means to support the light sensitive means substantially adjacent to the light source, and reflecting means located substantially at an intermediate point of the light path length and so that the field of vision is between the light source and the reflector and light from the source is reflected to the light sensitive means positioned adjacent to the light source along a light path substantially coplanar and parallel to the light path to the reflector.

6. A component for use in combination with apparatus adapted to produce a warning indication of the tendency of an individual toward sleep comprising a spectacle frame having a nosepiece and bows hinged thereto, means to establish an optical path between at least one of the hinged bows and the nosepiece so that when the spectacles are worn by a user the optical path is adapted to be eclipsed by the user's eyelashes during nictation, a light source and a light collimating means supported at one end of the optical path and a light sensitive means supported at the other end of the optical path to translate light directed thereto into electrical currents and means to connect the light sensitive elements to an alarm circuit.

7. A component for use in combination with apparatus adapted to produce a warning indication of the tendency of an individual toward sleep comprising a spectacle frame having a nosepiece and side bows hinged thereto, means to establish an optical path between at least one of the hinged bows and the nosepiece so that when the spectacles are worn by a user the optical path is adapted to be eclipsed by the user's eyelashes during nictation, a light source and a light collimating means supported on the nosepiece at one end of the optical path and a light sensitive means supported by the bows at the other end of the optical path to translate light directed thereto into electrical currents and means to connect the light sensitive element to an alarm circuit.

8. A pair of spectacles for use in combination with an alarm apparatus adapted to produce a warning indication of the tendency of an individual toward sleep comprising a nosepiece and a pair of side bows hinged thereto, means to establish an optical path between at least one of the hinged side bows and the nosepiece so that when the spectacles are worn by a user the optical path is adapted to be eclipsed by the user's eyelashes each time the user winks, a light source and a light collimating means supported at one end of the optical path and means responsive to light from the source and located at the other end of the optical path to translate light directed thereto into electrical currents and means to connect the light sensitive element to an alarm circuit.

References Cited in the file of this patent

UNITED STATES PATENTS

| | | |
|---|---|---|
| 2,172,116 | Warren | Sept. 5, 1939 |
| 2,210,330 | Sequin et al. | Aug. 6, 1940 |
| 2,625,594 | Mathis | Jan. 13, 1953 |